Aug. 20, 1940.  A. J. SCHUTT  2,212,250
VEHICLE HEATING SYSTEM
Filed Jan. 7, 1938   2 Sheets-Sheet 1

Inventor
Arthur J. Schutt
By Blackmore, Spencer & Flint
Attorneys

Aug. 20, 1940.  A. J. SCHUTT  2,212,250

VEHICLE HEATING SYSTEM

Filed Jan. 7, 1938  2 Sheets-Sheet 2

Inventor
Arthur J. Schutt
By Blackmore, Spencer & Flint
Attorneys

Patented Aug. 20, 1940

2,212,250

UNITED STATES PATENT OFFICE 2,212,250

VEHICLE HEATING SYSTEM

Arthur J. Schutt, Lockport, N. Y., assignor to General Motors Corporation, Detroit, Mich., a corporation of Delaware Application January 7, 1938, Serial No. 183,762

5 Claims. (Cl. 237—12.3)

This invention relates generally to heating systems for automotive vehicles and more particularly to certain improvements in heating systems which utilize the engine cooling fluid as the heating medium.

In heating systems of this general type it has been the practice to circulate the fluid through the heater at the temperature attained in the engine jacket and provide a thermostatic means to control the passage of the fluid to the engine radiator so that a certain temperature must be reached and maintained before the heat of the fluid is dissipated in the radiator. If relatively low temperatures are maintained, the fluid passing through the car heater is not at a sufficiently high temperature to properly heat the car and there is also no heat available until some time after starting of the engine.

The present invention has for its principal object the provision of a "booster" to raise the temperature of the cooling fluid that is circulated through the heater and insure that sufficient heat will be obtained practically immediately after starting of the engine. The booster consists of a specially constructed heating unit which is adapted to be located in the engine exhaust system and which includes a set of tubes through which the fluid to the heater is circulated. The circulation of fluid through this heating unit is controlled by a thermostatic means whereby to obtain immediate heating of the fluid and maintain an effective operating temperature thereof at all times.

The above and other objects and advantages of the invention will be more apparent from the accompanying specification and drawings disclosing the novel construction, arrangement and combination of parts.

In the drawings wherein similar reference numerals are applied to corresponding parts in the several figures.

Figure 1:
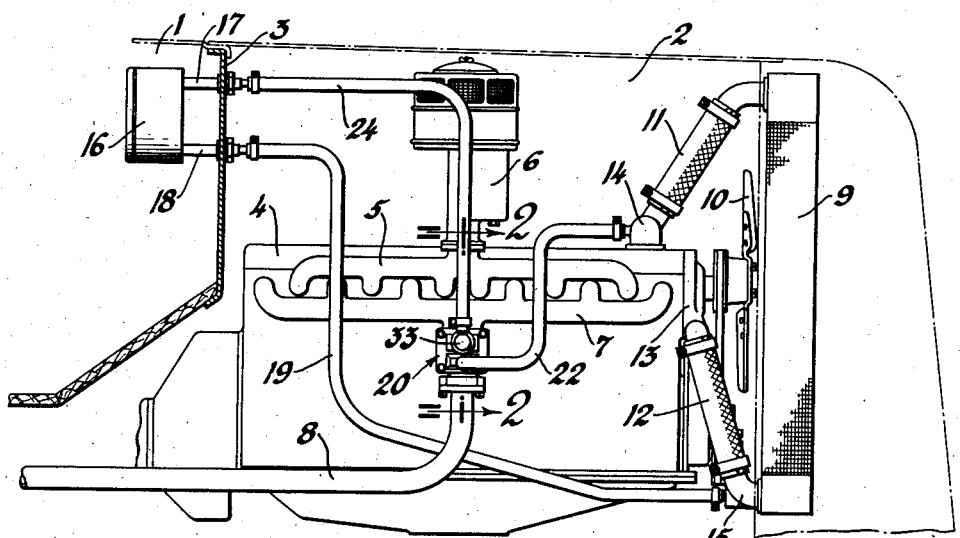
Figure 1 is a diagrammatic view of the heating system embodying my invention.

The heating system is illustrated as applied to an automobile for heating the passenger compartment 1 which is separated from the engine compartment 2 by the dash 3. The engine 4 has the usual intake manifold 5 connected with the carburetor 6 and has an exhaust manifold 7 connected with the exhaust pipe 8. The engine 4 is provided with a standard cooling system including the radiator 9 with fan 10, the upper and lower hose connections at 11 and 12, respectively, and the water circulating pump 13. The upper hose connection 11 is connected adjacent the engine to an elbow 14 in which a thermostat may be provided, if desired, to control the flow of cooling fluid from the engine jacket to the radiator. It will be understood that the pump 13 communicates with the engine jacket on its pressure side and its suction side is connected to the lower end of the radiator by the lower hose connection 12 and the outlet tank fitting 15.

The car heater, which is indicated only diagrammatically at 16, may be of any conventional construction but is preferably of the unit type which consists principally of a radiator core through which the fluid may be circulated and an electric motor-driven fan to circulate air through the radiator core within the vehicle body. No details of the heater have been shown except the supply and return pipes 17 and 18, respectively, which are connected with the top and bottom headers of the radiator core in the heater. The return pipe 18 is connected in the usual manner by hose 19 to the outlet tank fitting 15 at the lower end of the engine radiator 9, or if desired, such hose 19 may be connected to the lower hose 12 between the radiator 9 and the pump 13.

According to my invention the supply pipe 17 of the car heater is not connected directly with the engine jacket in the usual manner but the aforementioned booster unit is provided between the car heater and the engine jacket. This booster unit is indicated generally at 20 and in the form shown in Figures 1 to 3 is located on the exhaust manifold 7 adjacent the connection thereof to the exhaust pipe 8, and is provided with an inlet fitting 21 which is connected by hose 22 to the elbow 14 on the engine jacket, and with an outlet fitting 23 which is connected by hose 24 to the supply pipe 17 of the car heater 16.

Figures 2, 3:
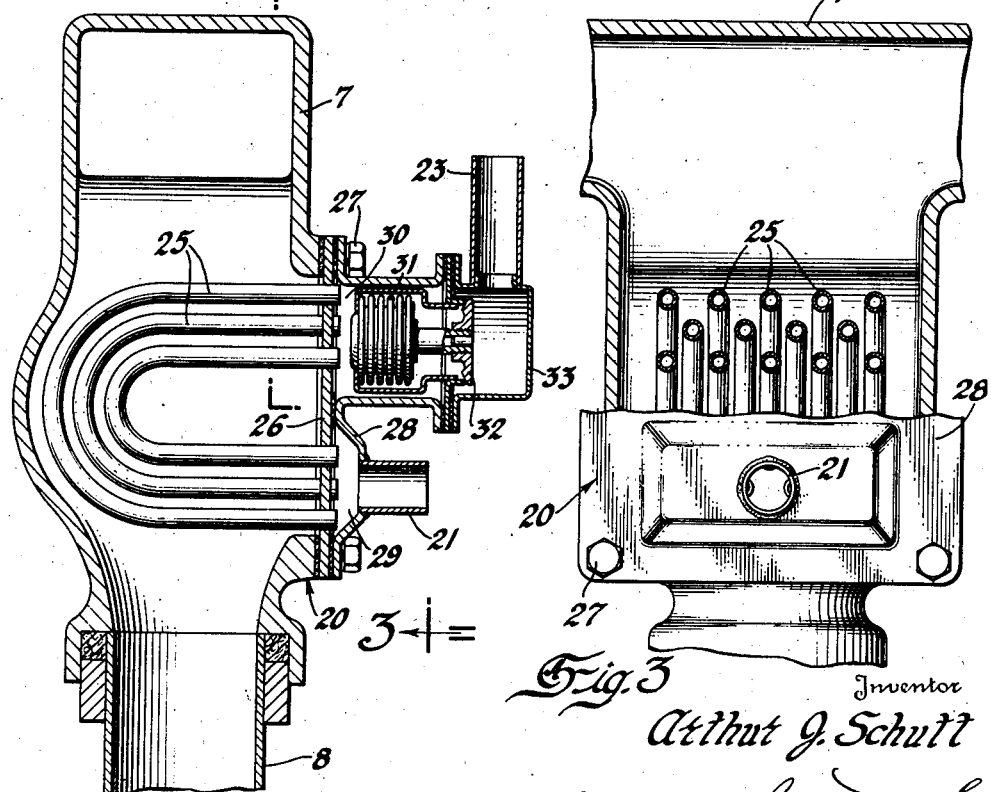
Figure 2 is an enlarged vertical section taken on the line 2—2 of Figure 1.
Figure 3 is a vertical section and elevation of Figure 2 taken substantially on line 3—3 of Figure 2.

Referring now to Figures 2 and 3, the booster unit 20 is provided with a plurality of U-shaped tubes 25 which have their ends secured to a plate 26 which is adapted to close an opening in the exhaust manifold with said tubes extending into the manifold so as to be in the path of the exhaust gases. This plate 26 is fastened to the exhaust manifold by bolts 27 which also serve to secure a further plate 28 to the outer side of the plate 26. The plate 28 is formed to provide a lower chamber 29 in communication with the lower ends of the tubes 25 and an upper chamber 30 in communication with the upper ends of the tubes 25.

The lower chamber 29 is provided with the inlet fitting 21 and the upper chamber 30 is formed with a cylindrical portion to provide a housing for the bellows 31 of a thermostatically operated valve 32 which is secured to the plate 28 by the cap 33 provided with the outlet fitting 23. This bellows 31 may be of the usual type which is made of flexible metal and contains a liquid having a relatively low boiling point so that when the bellows is surrounded by hot water the liquid therein will be vaporized and will generate a pressure within the bellows which will cause its expansion which is utilized to open the valve 32. The valve 32 is shown in Figure 2 in its closed position which it assumes when the temperature of the cooling medium of the engine is below the predetermined degree at which the bellows will actuate the valve.

Assuming that the engine 4 is just being started, the cooling water of the engine will be relatively cold and the bellows of the thermostat will be contracted and the valve 32 closed so that the cooling water cannot flow to the car heater 16 from the engine jacket. There will, however, be water in the system and the heat from the engine exhaust gases will heat the water in the tubes 25 and this hot water will cause the thermostat bellows to expand and open the valve 32 when the temperature thereof reaches some predetermined degree and allow the engine water pump to circulate the water through the car heater 16. It will, of course, be understood that the valve 32 will close whenever the water temperature falls below said predetermined degree so that, in effect, the thermostatic valve will maintain the water supplied to the car heater at substantially a predetermined temperature independently of the temperature of the water in the engine jacket or the engine radiator 9.

Figure 4:
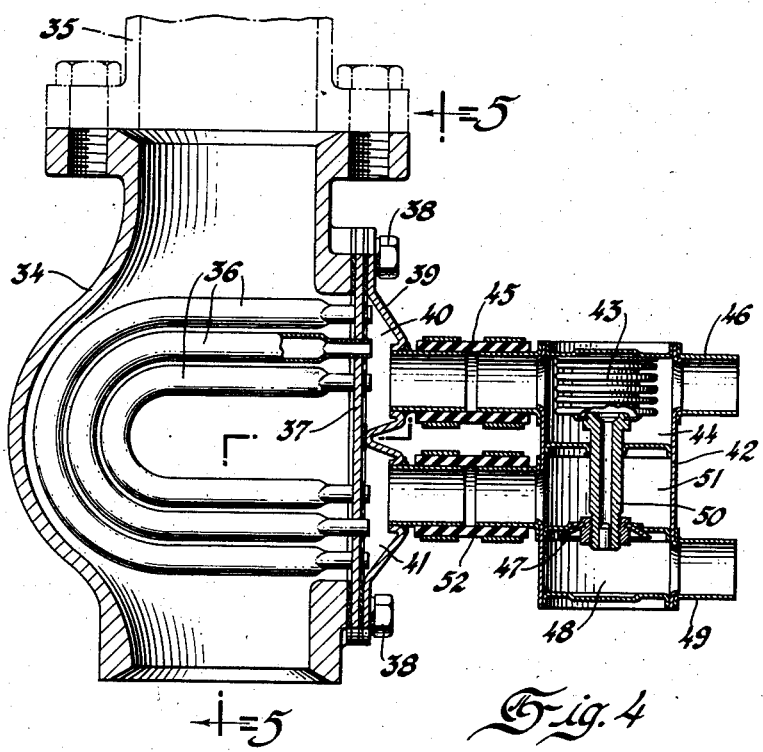
Figure 4 is a vertical section corresponding to Figure 2 of a modification.
Figure 5:
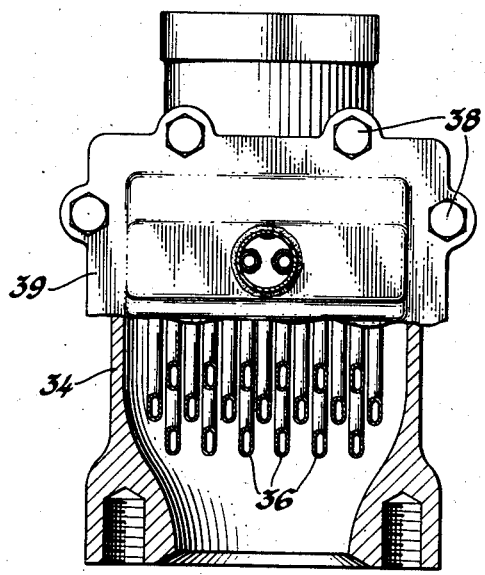
Figure 5 is a vertical section and elevation of Figure 4 taken substantially on line 5—5 of Figure 4.

With reference to the showing in Figures 2 and 3, the booster unit has been described as mounted directly on the exhaust manifold but it is contemplated that this unit can be located at any desired position in the engine exhaust system, and in Figures 4 and 5 the booster unit is shown as provided with a separate casing 34 which may be secured to the exhaust manifold outlet 35 at its upper end and have the usual exhaust pipe connected to its lower end.

Referring now to other features of the form of the invention shown in Figures 4 and 5, it will be seen that the U-shaped tubes 36 are flattened to permit the use of more tubes than are present in the form shown in Figures 2 and 3 in the same space and still provide substantially the same space between the tubes for the passage of exhaust gases. The ends of these tubes 36 are secured through the header plate 37 which is mounted on the casing 34 in the same manner as in the form heretofore described, as by bolts 38 which also serve to secure the further plate 39 which is formed to provide upper and lower chambers, 40 and 41, respectively, in communication with the upper and lower ends of the tubes 36.

The thermostatic control valve in this form is mounted within a separate casing, indicated generally at 42, which is divided into three chambers and provided with suitable fittings for connection in the system. The bellows 43 is located in the upper chamber 44 which is connected by means such as the hose 45 to the chamber 40 and is provided with the outlet fitting 46 adapted to be connected to the supply pipe 17 of the car heater 16 as shown in Figure 1. This bellows 43 is adapted to operate the valve 47 in the bottom chamber 48 which is provided with an inlet fitting 49 adapted to be connected to the elbow 14 on the engine jacket as shown in Figure 1. The valve 47 is connected to the bellows 43 by the operating stem 50 which passes through the central chamber 51 which is connected by means such as the hose 52 to the chamber 41. On reference to Figure 4 it will be seen that the valve 47 is adapted to control the passage of water from the bottom or inlet chamber 48 to the central chamber 51 and thereby control the supply of water to the tubes 36, and that this valve 47 is adapted to be operated by the bellows 43 in accordance with the temperature of the outlet water from the tubes 36.

The operation of the form of the invention shown in Figures 4 and 5 is generally similar to that above described with reference to Figures 1 to 3. When the system is cold, water from the engine jacket cannot flow through the car heating system as the valve 47 will be closed. The system will, however, be full or substantially filled with water so that when the engine is started the heat from the exhaust gases will heat the water in the boiler tubes 36 which, when heated, will expand to some extent and set up a flow past the bellows 43. When the temperature of this water reaches some predetermined degree the bellows will expand and open the valve 47 which will allow the engine water pump to then cause a positive flow of water through the tubes 36 and the car heater 16. Thus, the thermostatic valve will maintain the water outlet from the tubes at a predetermined temperature independently of the temperature of the water which is supplied to the tubes from the engine jacket.

It should be understood that the location of the booster unit in the engine exhaust system and the construction and arrangement of the tubes in the booster unit, as shown in Figures 4 and 5, may be substituted for the location and construction and arrangement of these parts as shown in Figures 2 and 3, and vice versa. The principal difference between the two forms disclosed herein consists in the location of both the bellows and valve of the thermostatic control in the outlet from the exhaust heated tubes in Figures 2 and 3, and the location of the bellows in the outlet to operate the valve in the inlet to the exhaust heated tubes in Figures 4 and 5.

In both forms of the invention it will be apparent that means in the nature of a booster has been provided in the car heating system with a thermostatic control of the circulation of the engine cooling fluid through the system to insure an effective operating temperature at the car heater almost immediately after starting of the engine, and the invention relates not only to such a system but also to such details of the booster unit and associated parts, and obvious modifications thereof, as will be set forth in the appended claims.

I claim:

1. The combination with the engine of a motor vehicle and the cooling system for the engine, of a car heating system including a car heater radiator, means connecting said radiator with said engine cooling system so that the cooling fluid thereof may be circulated through said radiator, means between said engine cooling system and said radiator associated with the engine exhaust gases to heat the cooling fluid as it passes to said heater radiator, and a thermostatic control valve including thermostatic means adjacent the outlet from said last named means and a valve adjacent the inlet of said last named means which is operated by said thermostatic means to prevent circulation of fluid through said car heating system until the fluid in said last named means attains some predetermined temperature.

2. The combination with the engine of a motor vehicle and the cooling system for the engine, of a car heating system including a car heater radiator, means connecting said radiator with said engine cooling system so that the cooling fluid thereof may be circulated through said radiator, means between said engine cooling system and said radiator associated with the engine exhaust gases to heat the cooling fluid as it passes to said heater radiator, said means comprising heating tubes for said fluid located in the path of the exhaust gases, and a thermostatic control valve including a bellows adjacent the outlet from said heating tubes and subject to the temperature of the fluid therein and a valve controlling the inlet to said heating tubes and operated by said bellows to permit circulation of fluid through said tubes and the supply thereof to said car heater radiator only after said fluid attains some predetermined temperature.

3. In a heating system for motor vehicles including means for heating fluid by heat transfer from the exhaust gases of the vehicle engine, the combination with an exhaust passage of said engine, of an opening in said passage, a plurality of substantially U-shaped tubes through which fluid is circulated, a plate in which the ends of said tubes are mounted, means to secure said plate to said exhaust passage with said tubes extending through said opening into the path of the exhaust gases therein, means mounted on said plate to provide an inlet connection to one end of said tubes and an outlet connection to the other end of said tubes, and a thermostatic control valve mounted within said outlet connection and responsive to the temperature of the fluid therein.

4. In a heating system for motor vehicles including means for heating fluid by heat transfer from the exhaust gases of the vehicle engine, the combination with an exhaust passage of said engine, of means extending into the exhaust passage and through which fluid is circulated, said means being provided with inlet and outlet connections for fluid conducting means, a valve adjacent said inlet connection adapted to control the flow of fluid therethrough, and a thermostatic means adjacent said outlet connection adapted to operate said valve in accordance with the temperature of the fluid adjacent said thermostatic means.

5. In a heating system for motor vehicles including means for heating fluid by heat transfer from the exhaust gases of the vehicle engine, the combination with an exhaust passage of said engine, of means extending into the exhaust passage and through which fluid is circulated, said means being provided with inlet and outlet connections, a casing adjacent said exhaust passage having inlet and outlet chambers respectively in communication with said connections and adapted to be connected to fluid conducting means, the inlet chamber of said casing being provided with a valve controlling the supply of fluid to said inlet connection, and the outlet chamber of said casing being provided with a thermostatic bellows with means connecting said bellows to said valve whereby the supply of fluid to said means extending into the exhaust passage is controlled by the temperature of the fluid heated therein by the exhaust gases.

ARTHUR J. SCHUTT.